United States Patent [19]
King et al.

[11] Patent Number: 5,752,464
[45] Date of Patent: May 19, 1998

[54] PET FEEDING APPARATUS

[76] Inventors: Thomas N. King, 12329 Pocono, Apple Valley, Calif. 92308; Jason B. Ford, 8900 Chimney Rock, #74, Houston, Tex. 77096

[21] Appl. No.: 775,708

[22] Filed: Dec. 17, 1996

[51] Int. Cl.⁶ .............................. A01K 5/01; B65D 1/24; B65D 6/28
[52] U.S. Cl. .............. 119/63; 119/51.5; 220/4.24; 220/23.8; 220/524
[58] Field of Search ................ 220/4.24, 4.25, 220/23.8, 524; 119/63, 61, 51.5

[56] References Cited

U.S. PATENT DOCUMENTS

| | | | |
|---|---|---|---|
| D. 299,771 | 2/1989 | Kennedy | D30/130 |
| D. 315,974 | 4/1991 | Steiner | D30/131 |
| D. 346,465 | 4/1994 | Russell et al. | D30/130 |
| 3,137,272 | 6/1964 | Lepper | 119/63 |
| 4,192,256 | 3/1980 | Clugston | 119/51.5 |
| 4,298,104 | 11/1981 | Leong | 383/15 |
| 4,532,891 | 8/1985 | Jones | 119/51 FS |
| 4,934,549 | 6/1990 | Allen | 220/524 |
| 5,009,310 | 4/1991 | Finney | 206/229 |
| 5,209,184 | 5/1993 | Sharkan et al. | 119/61 |
| 5,222,990 | 6/1993 | Elliott | 119/51.5 |
| 5,305,906 | 4/1994 | Dietrich et al. | 220/304 |
| 5,458,087 | 10/1995 | Prior et al. | 119/51.5 |
| 5,462,192 | 10/1995 | Pomroy et al. | 220/526 |
| 5,671,846 | 9/1997 | Frank | 220/524 |

Primary Examiner—John S. Hilten
Assistant Examiner—Daniel J. Colilla
Attorney, Agent, or Firm—Jackie Lee Duke

[57] ABSTRACT

The improved pet feeding apparatus is comprised of a pair of container portions adapted to receive food or water which are connected by a living hinge for folding the pet feeding apparatus into a compact package for travel. The container portions are threaded on their inner upper edge to accept a lid which seals the container portion when installed. The container portions includes a bowl shaped section with a skirt extending downwardly and outwardly to a lower rim which is below the lowest extent of the container portion. These lower rims provide a stable base for the container portions. The lower rims are connected by the living hinge which facilitates folding the container portions for transport and allows the lower rims of the container portions to lie flat on the floor when the pet is using the pet feeding apparatus. The lower rims also include a handle positioned opposite the living hinge. When the pet feeding apparatus is folded, the opposing handles snap together to lock the pet feeding apparatus in its folded, easily transportable configuration.

5 Claims, 5 Drawing Sheets

PET FEEDING APPARATUS

BACKGROUND OF THE INVENTION

1. Field of the Invention

This invention relates to a novel apparatus for transporting and dispensing food and water for a pet such as a dog or cat. The apparatus is constructed of a durable plastic material that allows the apparatus to be light weight and easily transportable, even when full of food and water. The present invention further distinguishes itself by being foldable into a compact package for ease of carrying.

It is well known that millions of house pets, particularly cats and dogs, require daily feeding and a constant supply of water for good pet health. Moreover, these pets accompany their owners on trips by automobile such as vacations or daily outings. These outings pose problems for the owner including preparing and serving the pet's food, lack of suitable containers for the pet's food and water, the need to transport the food and water in separate containers, preventing the pet from tipping over the container during use, clean up of the containers after use and storage of the unused food and water. Pet owners' have a long felt need for a pet feeding and watering apparatus which addresses these problems. The present invention addresses these problems with a light weight compact apparatus that is easily transportable.

2. Description of Related Art

The use of pet bowls or feeding containers with various closure methods is well known in the prior art. These prior devices all fail in one or more respects to address the problems described.

U.S. Pat. No. 4,192,256 to Cluston discloses a feeding and water device for pets with an integral means for carrying water.

U.S. Pat. No. 4,532,891 to Jones shows a pet feeder assembly with a means for collecting spilled pet food.

U.S. Pat. No. 5,009,310 to Finney discloses a disposable container for storing and dispensing pet food.

U.S. Pat. No. 5,209,184 to Sharkan et al. discloses a pet travel bowl with a resealable lid and a fastener for securing the bowl in a given location.

U.S. Pat. No. 5,458,087 to Prior et al. shows a pair of connected pet bowls with a closure mechanism for sealing the bowl.

SUMMARY OF THE INVENTION

In view of the disadvantages with the known types of pet bowls and feeding apparatus, the present invention provides an improved pet feeding and watering apparatus with sealable container portions by which storage and transportation of a pet's food and water are simplified.

The improved pet feeding apparatus comprises a pair of container portions adapted to receive food or water connected by a living hinge for folding the pet feeding apparatus into a compact package for travel. The container portions are threaded on their inner upper edge to accept a lid that seals the container portion when installed. The container portions include a bowl shaped section with a skirt extending downwardly and outwardly to a lower rim that is below the lowest extent of the container portion. These lower rims provide a stable base for the container portions. The lower rims are connected by a living hinge that allows folding the pet feeding apparatus for transport and allows the lower rims of the container portions to lie flat on the floor when the pet is using the pet feeding apparatus. The lower rims also include a handle positioned opposite the living hinge. When the pet feeding apparatus is folded, the opposing handles snap together to lock the pet feeding apparatus in its folded, easily transportable configuration.

It is a principal object of the present invention to provide a pet feeding and watering apparatus that allows a pet owner to store and transport a pet's food and water in one compact, easily transportable apparatus.

Another object of the present invention is to provide a pet feeding apparatus that allows a pet owner to prepare the pet's food before a trip and store the food in a sealable easily transportable apparatus.

A further object of the present invention is to provide a pet feeding apparatus that eliminates the need for a pet owner to carry additional containers for storing or serving food and water when traveling with one's pet.

A still further object of the present invention is to provide a pet feeding apparatus that provides a stable base to prevent the pet from tipping over the container during use.

A final object of the present invention is to provide a pet feeding apparatus that facilitates clean up of the containers after use and storage of the unused food and water.

These with other objects and advantages of the present invention are pointed out with specificness in the claims annexed hereto and form a part of this disclosure. A full and complete understanding of the invention may be had by reference to the accompanying drawings and description of the preferred embodiments.

BRIEF DESCRIPTION OF THE DRAWINGS

These and other objects and advantages of the present invention are set forth below and further made clear by reference to the drawings, wherein.

DESCRIPTION OF THE PREFERRED EMBODIMENT

Figure 1:
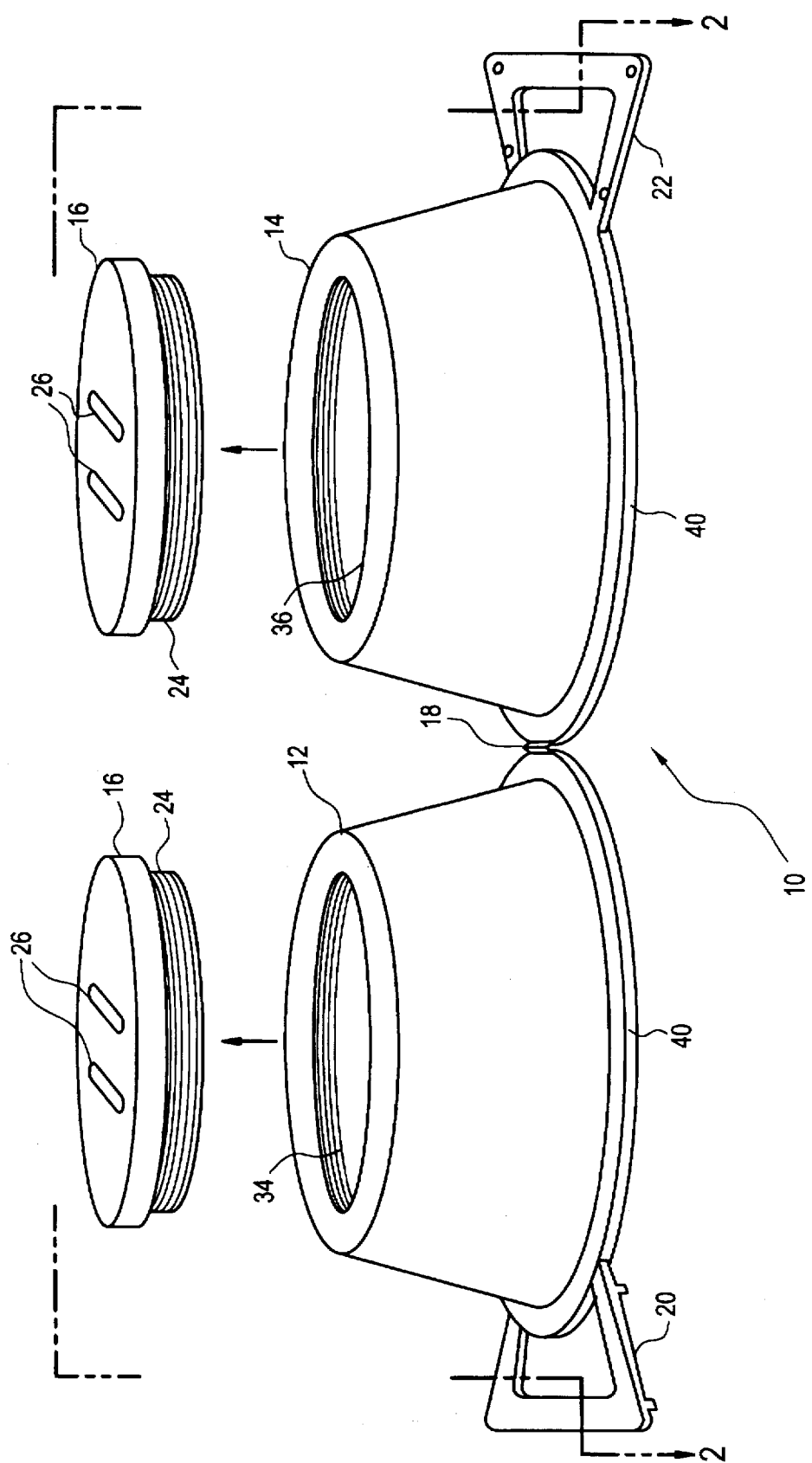
FIG. 1 is a perspective view of one embodiment of the pet feeding apparatus in accordance with the present invention.

With reference to the drawings, and particularly to FIG. 1, the preferred embodiment of the pet feeding apparatus of the present invention is denoted generally by reference numeral 10. Pet feeding apparatus 10 can be made of any suitable material as aluminum or, thermoformed plastic in the preferred embodiment shown. Pet feeding apparatus 10 is composed of two bowls or container portions 12 and 14, which can be sealed by lids 16 when not in use or for transport. The two bowls or container portions 12 and 14 are connected by a hinging means such as living hinge 18, well known to those of ordinary skill in the art. Bowls or container portions 12 and 14 include handles 20 and 22, respectively, which are shaped to aid in the folding and transport of pet feeding apparatus 10 in a manner to be described hereinafter. Lids 16 are preferably molded of a thermoformed plastic with threads 24 formed thereon. Finger notches 26 are also molded in the top of lids 16 to aid the user in threading and unthreading lids 16 from container portions 12 and 14.

Figure 2:
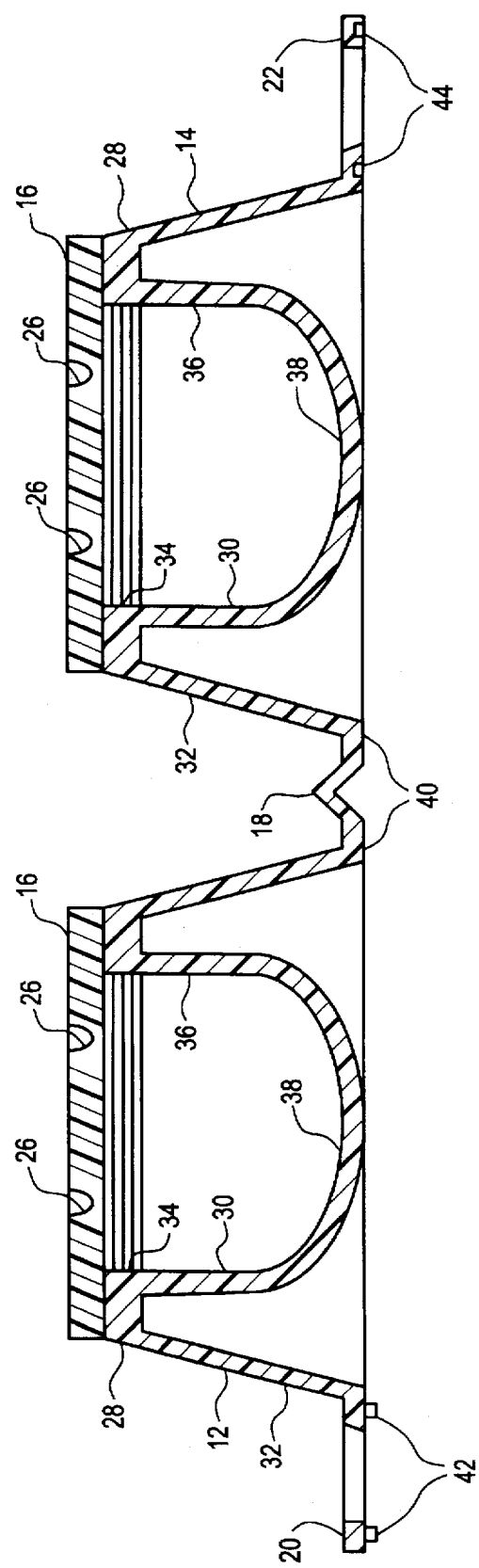
FIG. 2 is a sectional view taken along line 2—2 of FIG. 1 with the pet feeding apparatus unfolded for use.

A sectional view of pet feeding apparatus 10 is shown in FIG. 2 that shows details of the construction of bowls or container portions 12 and 14, handles 20 and 22 and lids 16. Bowls or container portions 12 and 14 are preferably thermoformed of a plastic material with a top rim 28 from which inner bowl 30 and outer shell 32 depend. Top rim 28 has threads 34 formed thereon for engagement with threads 24 of lids 16 as described previously. Inner bowls 30 include substantially vertical side walls 36 which extend downward to lower bowl section 38 which is shown to be of generally hemispherical shape. Outer shell 32 is of a generally conical shape extending downwardly and outwardly from top rim 28 to lower rim 40. Lower rim 40 and lower bowl section 38 are formed such that lower rim 40 lies at or slightly below lower bowl sections 38 of container portions 12 and 14. This configuration allows the lower rims 40 to lie substantially flat when the pet feeding apparatus 10 is unfolded as shown in FIGS. 1 and 2. This ensures a stable base for the pet feeding apparatus 10 to prevent the bowl or container portions 12 and 14 from tipping over when the pet is using the pet feeding apparatus.

Figure 3:
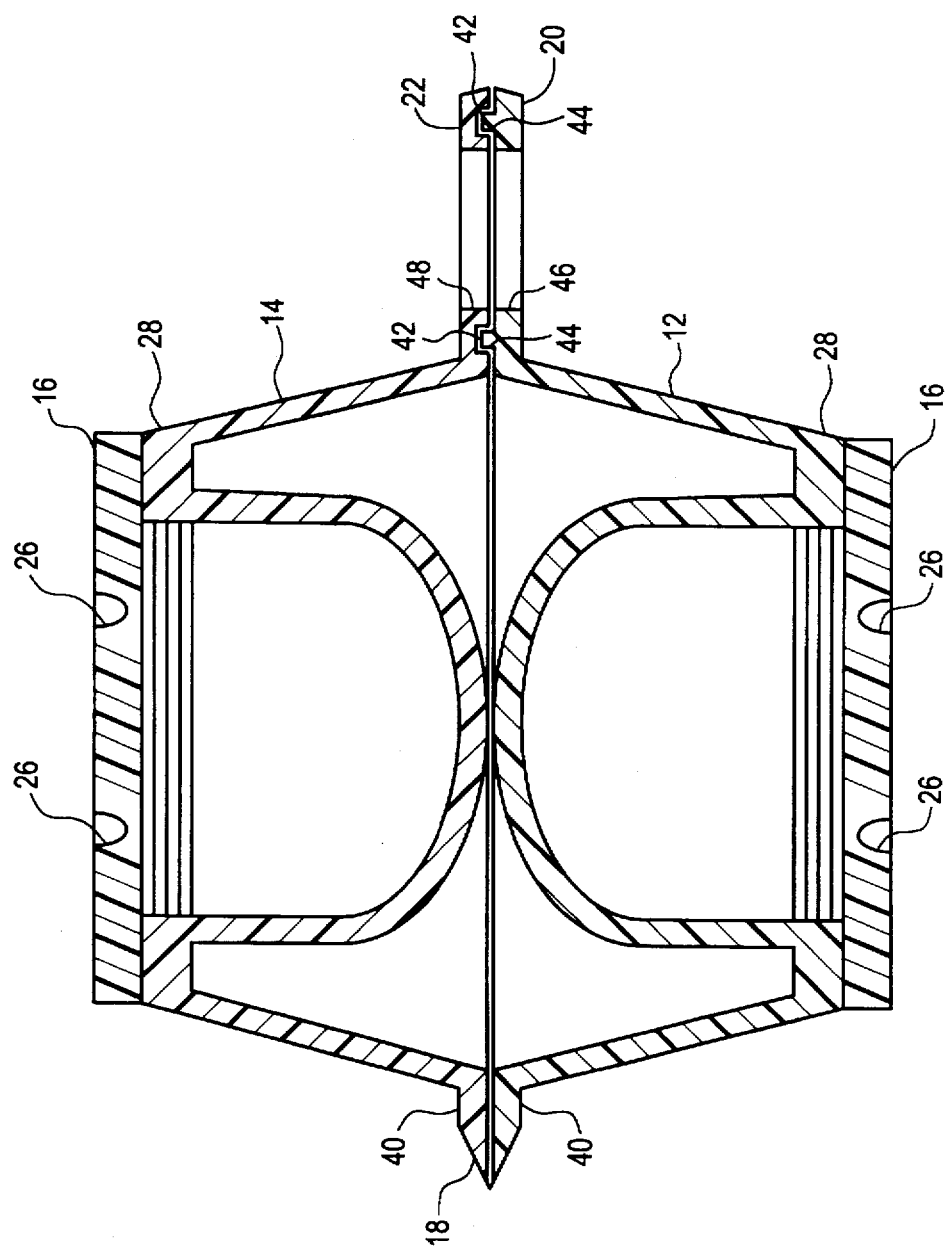
FIG. 3 is a sectional view with the pet feeding apparatus folded for transport.

Handle 20 of container portion 12 includes protrusions 42 which engage cavities 44 of handle 22 of container portion 14 when the pet feeding apparatus 10 is folded as shown in FIG. 3. In the folded position in FIG. 3, pet feeding apparatus 10 is configured for storing or transporting the pet's food and water. Container portions 12 and 14 have been folded about hinging means or living hinge 18. This allows handles 20 and 22 to be pressed into engagement and thereby allow protrusions 42 to engage cavities 44. Protrusions 42 and cavities 44 are sized to ensure a tight fit therebetween and lock the handles together. Handles 20 and 22 are formed with cutouts or handholds 46 and 48, respectively, therein. Cutouts or handholds 46 and 48 are arranged to align when handles 20 and 22 are snapped together and provide the pet owner a convenient means for carrying the pet feeding apparatus 10. Lids 16 sealingly engage upper rim 28 to prevent any spillage of the pet's food or water during transport or storage.

Figure 4:
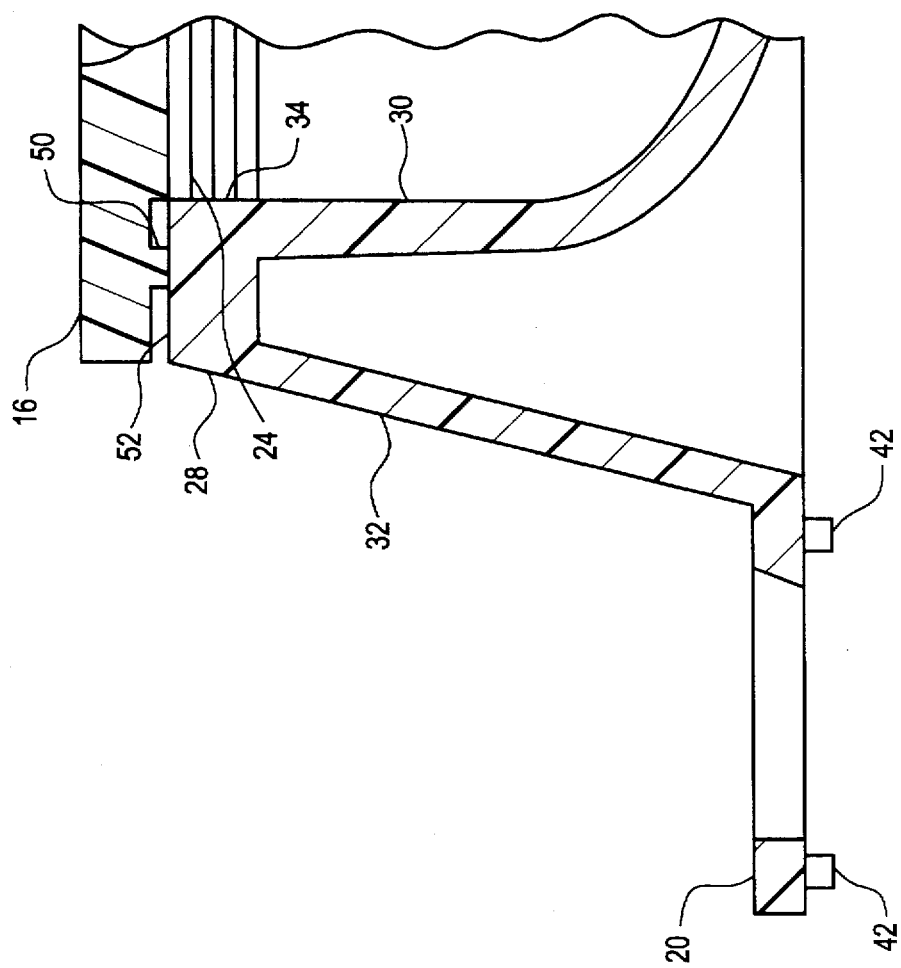
FIG. 4 is a sectional view of the lid sealing details.

FIG. 4 shows the details of the sealing engagement between lids 16 and container portions 12 and 14. Lids 16 include a sealing lip 50 formed on the outer periphery of the lids radially outside threads 24. When threads 24 of lid 16 engage threads 34 of container portions 12 and 14, sealing lip 50 is forced into contact with sealing surface 52 formed on the top surface of rim 28. This ensures a tight seal of lids 16 to container portions 12 and 14, even when in the inverted position of FIG. 3.

Figure 5:
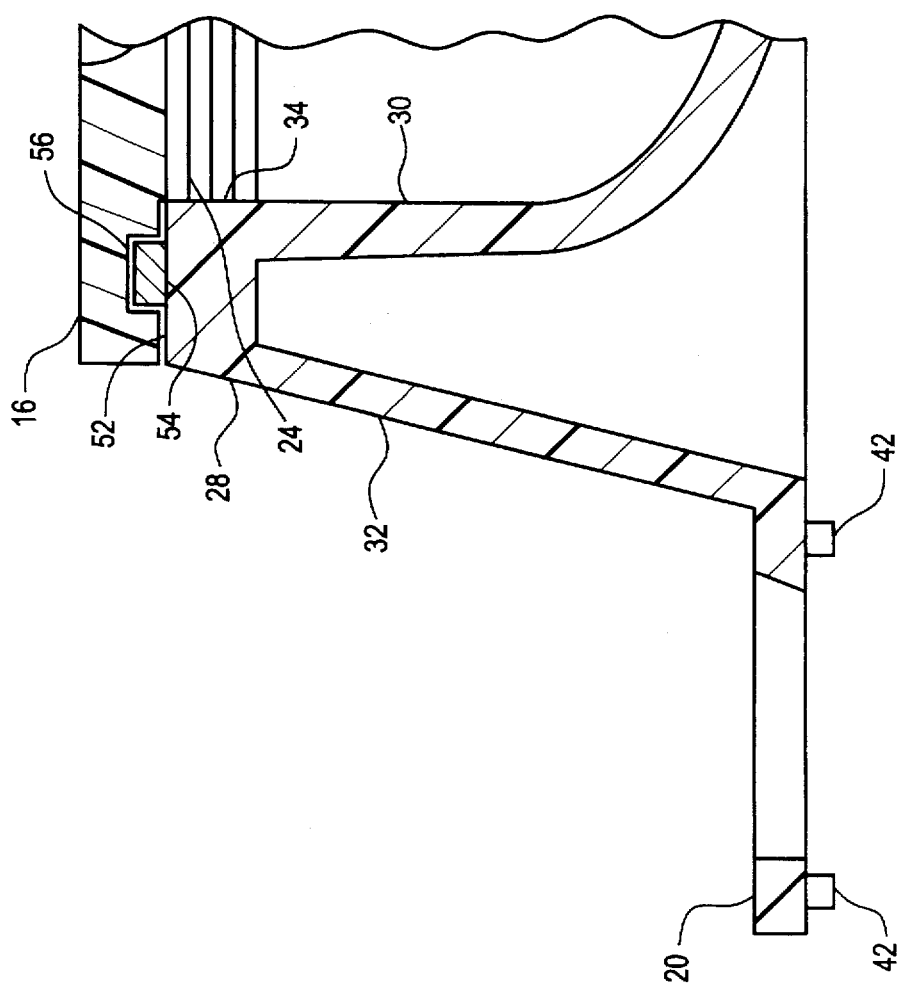
FIG. 5 is a sectional view of an alternative means for sealing the lid.

An alternative sealing arrangement is shown in FIG. 5. Container portions 12 and 14 are identical in configuration to that of the preferred embodiment. Lid 16 is modified by forming sealing groove 54 in its lower surface in place of sealing lip 50. A sealing element 56 of suitable elastomeric material is positioned within sealing groove 54. Sealing element 56 is sized to fill sealing groove 54 and be a snug fit therein. Sealing element 56 is also sized to extend out from the lower edge of lids 16 and seal against sealing surface 52 formed on the top surface of rim 28.

The construction of our pet feeding apparatus will be readily understood from the foregoing description and it will be seen we have provided an improved apparatus for pet feeding and watering with sealable container portions whereby storage and transportation of a pet's food and water is simplified. Furthermore, while the invention has been shown and described with respect to certain preferred embodiments, it is obvious that equivalent alterations and modifications will occur to others skilled in the art upon the reading and understanding of the specification. The present invention includes all such equivalent alterations and modifications, and is limited only by the scope of the appended claims.

What is claimed is:

1. A pet feeding apparatus for transporting and dispensing food and water, comprising:

a plurality of container portions each having an outer shell and an animal-accessible inner bowl to receive food or water;

a lid sealingly engaging each of said animal-accessible inner bowls to form a watertight seal;

said outer shell of each of said plurality of container portions including a lower rim;

said container portions hingedly connected by a hinging means between said lower rim of each of said container portions whereby said container portions may move between a closed position wherein said lower rims of said container portions are substantially parallel and immediately adjacent to one another and an open position wherein said lower rims of said container portions are side by side and lie substantially in the same plane; and, a handle integrally formed on said lower rim of each of said plurality of container portions opposite said hinging means, said handles including a means for releasably locking said handles together and carrying said pet feeding apparatus when said container portions are in said closed position, said handles lying in substantially the same plane as said lower rim of each of said container portions when said container portions are in said open position.

2. A pet feeding apparatus for transporting and dispensing food and water according to claim 1 wherein:

each of said lids includes finger notches formed in the top portion of each lid whereby said finger notches may be grasped by a user to facilitate engagement and removal of said lids.

3. A pet feeding apparatus for transporting and dispensing food and water according to claim 2 wherein:

said hinging means for moving said container portions between said closed and said open positions is a living hinge integrally formed with said rim of said container portions.

4. A pet feeding apparatus for transporting and dispensing food and water according to claim 3 including:

a plurality of threads formed on the inner periphery of each of said inner bowls, a plurality of threads formed on the outer periphery of said lids, a sealing surface on each of said inner bowls adjacent said threads, a sealing lip on the outer periphery of said lids adjacent said threads, and said threads of said lids engaging said threads of said inner bowls to bring said sealing lip of said lids into sealing engagement with said sealing surface of said inner bowls to form a watertight seal.

5. A pet feeding apparatus for transporting and dispensing food and water according to claim 3 including:

a plurality of threads formed on the inner periphery of each of said inner bowls, a plurality of threads formed on the outer periphery of said lids, a sealing surface on each of said inner bowls adjacent said threads, a sealing groove on the outer periphery of said lids adjacent said threads, a seal element positioned within said sealing groove on the outer periphery of each of said lids, a sealing lip on the outer periphery of said lids adjacent said threads, and said threads of said lids engaging said threads of said inner bowls to bring said seal element of said lids into sealing engagement with said sealing surface of said inner bowls to form a watertight seal.

\* \* \* \* \*